Nov. 8, 1932.  A. WELIKES  1,887,384
PISTON ATTACHMENT
Filed Oct. 7, 1931  2 Sheets-Sheet 1
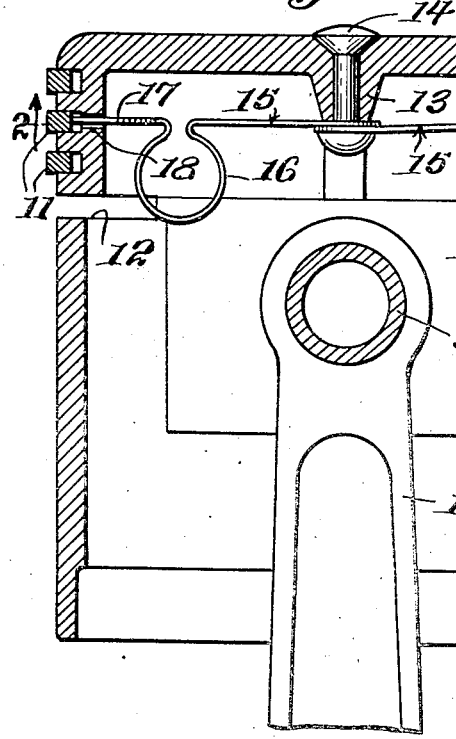
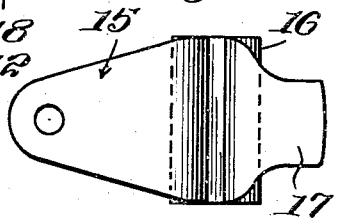
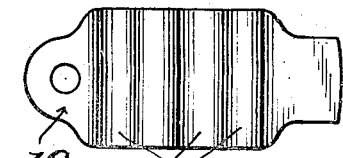
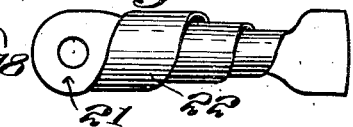
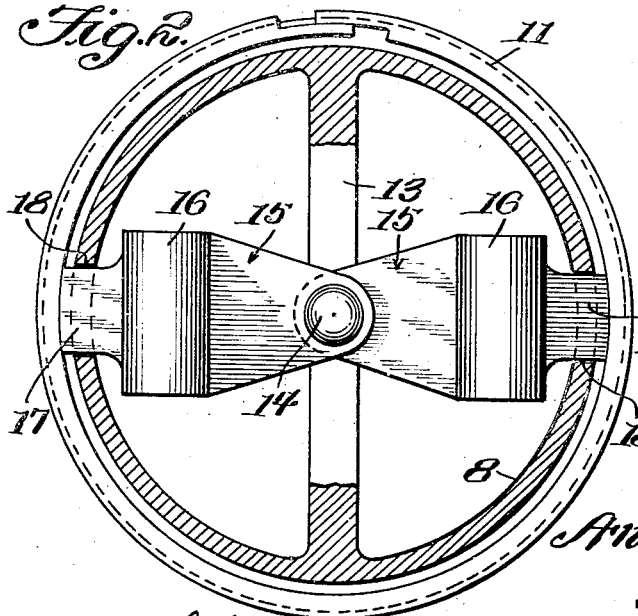
Anthony Welikes
INVENTOR
BY Victor J. Evans and Co. ATTORNEY

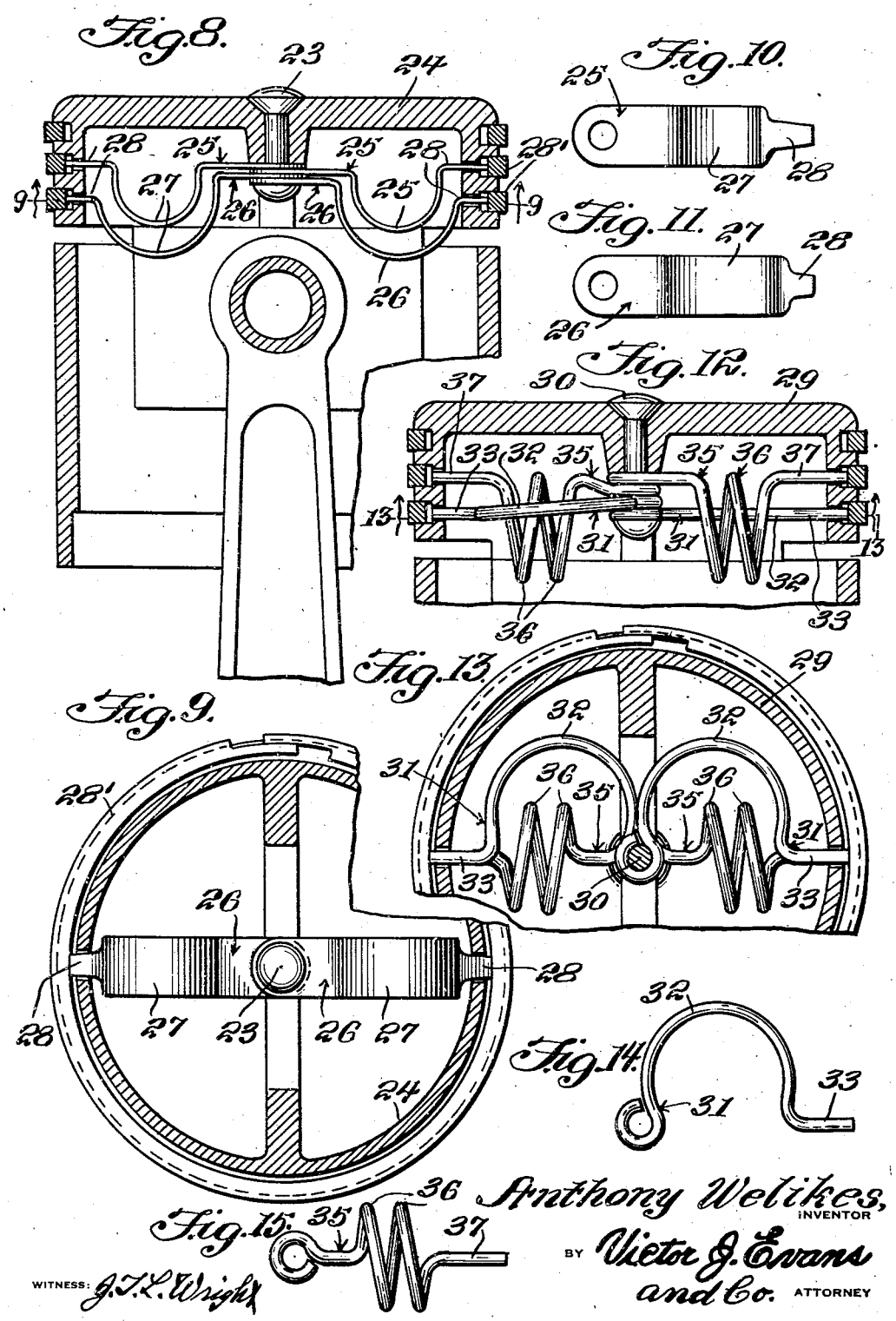

Patented Nov. 8, 1932

1,887,384

UNITED STATES PATENT OFFICE

ANTHONY WELIKES, OF ROCHESTER, NEW YORK

PISTON ATTACHMENT

Application filed October 7, 1931. Serial No. 567,479.

My present invention has reference to pistons for internal combustion engines, and my primary object is the provision of simple resilient means for exerting a yieldable pressure against one or more of the piston rings to urge the ring or rings against the wall of the engine cylinder and thereby prevent the piston "slaps" or piston "knocks" which frequently occur because the piston, in operation, moves from one to the other side of the cylinder and the ordinary piston rings are not always in proper contact with the wall of the cylinder.

To the attachment of the foregoing the invention consists in the construction hereinafter described and definitely claimed.

In the drawings:—

Figure 1 is a substantially central sectional view through a piston equipped with the improvement.

Figure 2 is a sectional view approximately on the line 2—2 of Figure 1, looking in the direction of the arrows.

Figure 3 is a plan view of one of the yieldable shock absorbing elements.

Figure 4 is a similar view of another form.

Figure 5 is a side elevation.

Figure 6 is a side view illustrating another form.

Figure 7 is a plan view thereof.

Figure 8 is a sectional view similar to Figure 1 illustrating another form of the improvement.

Figure 9 is a sectional view approximately on the line 9—9 of Figure 8.

Figures 10 and 11 are plan views of the yieldable shock absorbing elements.

Figure 12 is a sectional view illustrating still further forms of the improvement.

Figure 13 is a sectional view approximately on the line 13—13 of Figure 12.

Figure 14 is a plan view of one of the yieldable elements employed in the construction disclosed by Figures 12 and 13.

Figure 15 is a similar view of another yieldable element employed in the disclosure of Figures 12 and 13.

The piston 8 is of usual construction, the same being provided with the wrist pin 9 for the connecting rod 10. The piston, adjacent to its upper end or head is provided with the usual spaced annular rings, in which are arranged the split spring piston rings 11 and below the rings the piston is provided with oil inlet slots 12.

In the showing of the drawings the piston 8 at its center is provided with a rib 13 and passing through this rib there is a double headed rivet 14. The rivet is designed to pass through eyes or openings in the inner ends of the shock absorbing elements. Several forms of such elements are disclosed by the drawings, but all the elements have their inner ends provided with eyes or openings that receive therethrough the rivet 14, the said ends of the elements being in contacting engagement and one of the same resting on inner head of the rivet and the second is forced into contact with the rivet 14. In the showing of Figures 1 and 2 the absorbing elements are in the nature of flat spring plates 15 which are gradually widened from their pivotal ends to a point adjacent their second or outer ends. The widened portions of the spring plates 15 are curved or rounded beyond the longitudinal plane of said flat plates, as at 16, thus providing each of the plates 15 with a resilient part or element that spreads or expands a sufficient distance to force the outer or free end of each of the said plates away from the inner or fixed ends of the said plates. The plates have their free ends beyond the resilient or expansible elements 16 formed with tongues 17. These tongues pass in suitable slots or openings 18 in the side walls of the piston 8 and are in direct contact with one of the split piston rings 11. The members 15 thus exert a yieldable pressure against the inner face of the ring 11, urging the same outwardly from its groove so that the said ring will at all times be in proper contacting engagement with the walls of a cylinder for the piston, regardless or any canting or any tendency of movement of the piston from one to the opposite wall of the cylinder. Thus the "slaps" or "knocks" commonly known in the ordinary construction of pistons will be effectively overcome in an extremely simple manner.

By reference to Figure 2 it will be seen that the slots 18 through which the tongues 17 of the members 15 pass are of a greater length than the width of the tongues, so the members 15 are permitted a limited turning on the pivot 14. Also by reference to this figure it will be noted that the outer ends of the tongues 17 are rounded to conform to the inner contour of the ring 11.

The spring absorbing element disclosed by Figures 4 and 5 of the drawings is simply a modification of the construction above described, in this instance the spring plate 19 has its body portion bent in opposite directions so the said body is corrugated as at 20, while in Figures 6 and 7 the spring plate 21, between its ends is rolled or coiled upon itself as at 22, the convolutions of the coils being received one in the other. In all instances the spring plates are provided with tongues that pass through the openings 18 to contact with the piston rings and to exert a yieldable pressure against such rings.

The above description refers to the construction disclosed by Figures 1 to 7 respectively.

In Figures 8 to 11 the construction is substantially similar to that disclosed by Figure 1, there being secured to the double headed rivet 23 that passes through the rib in the piston 24 the inner end portions of oppositely directed pairs of upper and lower flat shock absorbing plates. These spring members 25 and 26 have their body portions adjacent to their outer or free ends curved or rounded to provide the said face with integral resilient elements 27 which causes the outer or free end of the said plates to move away from the inner or fixed ends of the said plates. The pivoted or connected ends of the members 25 and 26 are arranged in lapping relation and the outer ends thereof are provided with reduced centrally extending tongues 28 that pass through openings in the sides or skirt of the piston received in the grooves for a pair of the piston rings 28. The spring members 25 and 26 urge the piston rings outwardly in a manner and for the purpose as previously described.

In Figure 12 the spring shock absorbing elements also comprise upper and lower members which are in the nature of spring rods and which have their confronting ends provided with eyes disposed in lapping relation and secured to the rib and to the head of the piston 29 by a double headed rivet 30. The spring members are oppositely directed, one pair of the same, indicated by the numerals 31, being arched horizontally through the eye end thereof, as at 32, to provide the same with an outer finger 33 that passes through openings in the side of the piston and contacts with the rings in the grooves. The second absorbing elements 35, on the center thereof, are centrally coiled upon themselves, as at 36, and provided with outer fingers 37 that pass through openings in the pistons and to contact with the piston rings.

It is believed the foregoing description, when read in connection with the accompanying drawings, will set forth my construction and the advantages thereof without further detailed description.

What I claim is:

1. A piston having ring grooves, and split rings in said grooves, and being also provided with openings that communicate with one or more of the grooves, a rivet member passed through the head at the center of the piston, oppositely directed flat metal plates having their inner ends fixed on the rivet, each of said plates, adjacent to its outer end, having a rounded portion, to afford the said plate with a resilient element, which is expansible to force the free end of the plate away from the fixed portion thereof, and the free end of each of the plates having reduced tongues to pass through the openings in the piston to enter the grooves and contact with the split rings in said grooves.

2. A piston having ring grooves, and split rings in said grooves, and being also provided with openings that communicate with one or more of the grooves, a rivet member passed through the head at the center of the piston, oppositely directed flat metal plates having their inner ends fixed on the rivet, each of said plates having its outer end reduced to afford a tongue which passes through an opening and contacts with a ring in the groove of the piston and each of said plates being shaped to increase the natural resiliency thereof and to force the tongue end longitudinally away from the fixed end thereof.

In testimony whereof I affix my signature.

ANTHONY WELIKES.